United States Patent
Bevilaqua et al.

(10) Patent No.: US 9,932,701 B2
(45) Date of Patent: Apr. 3, 2018

(54) LAUNDRY APPLIANCES USING SEARCH COILS TO IDENTIFY MOTORS AND THEIR ROTORS IN ORDER TO SELF-TUNE CONTROL OF THE MOTOR

(71) Applicant: WHIRLPOOL CORPORATION, Benton Harbor, MI (US)

(72) Inventors: Matheus Alexandre Bevilaqua, Howick (NZ); Marcelo Campos Silva, Benton Harbor, MI (US)

(73) Assignee: Whirlpool Corporation, Benton Harbor, MI (US)

( * ) Notice: Subject to any disclaimer, the term of this patent is extended or adjusted under 35 U.S.C. 154(b) by 136 days.

(21) Appl. No.: 14/982,297

(22) Filed: Dec. 29, 2015

(65) Prior Publication Data

US 2017/0183804 A1 Jun. 29, 2017

(51) Int. Cl.
| H02P 27/06 | (2006.01) |
| D06F 37/30 | (2006.01) |
| H02P 29/64 | (2016.01) |
| D06F 33/02 | (2006.01) |

(52) U.S. Cl.
CPC ........... D06F 37/304 (2013.01); D06F 33/02 (2013.01); H02P 27/06 (2013.01); H02P 29/64 (2016.02); D06F 2202/06 (2013.01); D06F 2202/12 (2013.01); D06F 2204/06 (2013.01)

(58) Field of Classification Search
CPC ......... D06F 37/304; H02P 27/06; H02P 29/64
USPC ............................................................ 318/3
See application file for complete search history.

(56) References Cited

U.S. PATENT DOCUMENTS

| 4,926,077 A | 5/1990 | Gauthier et al. |
| 5,708,336 A | 1/1998 | Eyerly et al. |
| 6,929,396 B2 | 8/2005 | Gramsamer et al. |
| 7,265,954 B2 | 9/2007 | Hikawa et al. |
| 7,952,318 B2 | 5/2011 | Lu et al. |
| 8,013,565 B2 | 9/2011 | Miura |
| 8,072,169 B2 | 12/2011 | Kim et al. |
| 8,084,984 B2 | 12/2011 | Lu et al. |
| 8,251,579 B2 | 8/2012 | Lesmeister et al. |
| 8,384,338 B2 | 2/2013 | Lu et al. |
| 9,221,480 B2 * | 12/2015 | Daum ................. B61L 15/0081 |
| 9,673,739 B2 * | 6/2017 | Bosga ....................... H02P 6/22 |
| 9,680,402 B2 * | 6/2017 | Hassanpour Isfahani .................. H02P 1/423 |
| 2006/0186851 A1 * | 8/2006 | Nguyen Phuoc ......... H02P 1/30 318/609 |
| 2008/0074070 A1 * | 3/2008 | Kumar ..................... B60L 9/00 318/561 |
| 2012/0181967 A1 | 7/2012 | Fulton et al. |

(Continued)

FOREIGN PATENT DOCUMENTS

KR 20090042519 A * 4/2009

*Primary Examiner* — Kawing Chan
(74) *Attorney, Agent, or Firm* — Price Heneveld LLP

(57) ABSTRACT

A laundry appliance is provided, comprising a motor and a controller connected to the motor. The controller determines at least one characteristic of the motor, identifies the motor from a plurality of possible known motors based on the at least one characteristic, identifies the rotor from a plurality of possible known rotors based on the at least one characteristic, and configures at least one motor operation parameter based on the identity of the motor and/or rotor. The at least one characteristic may include the resistance of a stator coil and/or a magnetic flux constant.

20 Claims, 6 Drawing Sheets

(56) References Cited

U.S. PATENT DOCUMENTS

| | | |
|---|---|---|
| 2013/0033215 A1 | 2/2013 | Krishnamurthy et al. |
| 2013/0285588 A1* | 10/2013 | Ito .......................... H02P 23/14 |
| | | 318/490 |
| 2014/0009095 A1 | 1/2014 | Greetham et al. |
| 2014/0055103 A1 | 2/2014 | Dooley |
| 2014/0189959 A1 | 7/2014 | Dokonal et al. |
| 2014/0265656 A1 | 9/2014 | Dedrich |
| 2014/0265990 A1* | 9/2014 | Chretien ................ H02P 21/16 |
| | | 318/558 |
| 2015/0029620 A1 | 1/2015 | Negre et al. |
| 2015/0267663 A1* | 9/2015 | Namuduri ............ F02M 51/005 |
| | | 239/71 |
| 2015/0267670 A1* | 9/2015 | Nehl ................. F02M 51/0671 |
| | | 239/585.1 |
| 2015/0330861 A1* | 11/2015 | Alsaleem ............. G01M 3/025 |
| | | 702/183 |

* cited by examiner

LAUNDRY APPLIANCES USING SEARCH COILS TO IDENTIFY MOTORS AND THEIR ROTORS IN ORDER TO SELF-TUNE CONTROL OF THE MOTOR

BACKGROUND

The present specification generally relates to laundry appliances, and more specifically, to motor control in washing appliances and clothes dryers.

SUMMARY

In at least one aspect, a laundry appliance is provided, comprising a motor and a controller connected to the motor. The controller includes a microprocessor and a memory containing a plurality of instructions that, when executed by the microprocessor, cause the microprocessor to: determine a characteristic of the motor, identify the motor from a plurality of possible known motors based on the characteristic, and configure at least one motor operation parameter based on the identity of the motor.

In at least another aspect, a laundry appliance is provided comprising a motor including a rotor and a stator, and a controller connected to the motor. The controller includes a microprocessor and a memory containing a plurality of instructions that, when executed by the microprocessor, cause the microprocessor to: determine a characteristic of the motor, identify the rotor from a plurality of possible known rotors based on the characteristic of the motor, and configure at least one motor operation parameter based on the identity of the rotor.

In at least another aspect, a method of controlling a motor in a laundry appliance is provided. The method includes determining a characteristic of the motor; identifying the motor from a plurality of possible known motors based on the characteristic; configuring at least one motor operation parameter based on the identity of the motor; and controlling the motor using the at least one motor operation parameter.

These and other features, advantages, and objects of the present device will be further understood and appreciated by those skilled in the art upon studying the following specification, claims, and appended drawings.

DETAILED DESCRIPTION OF EMBODIMENTS

Figure 1:
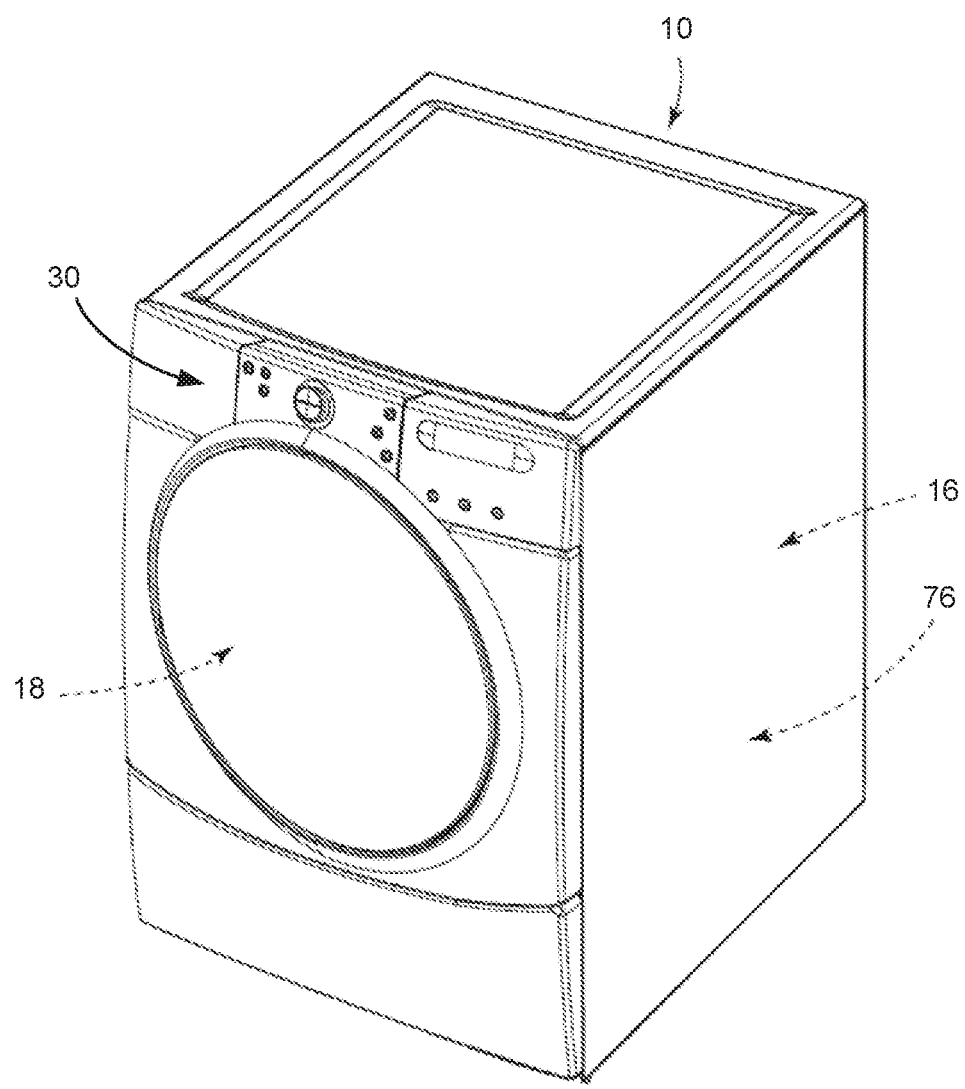
FIG. 1 is a top perspective view of a laundry appliance according to one embodiment.
Figure 4:
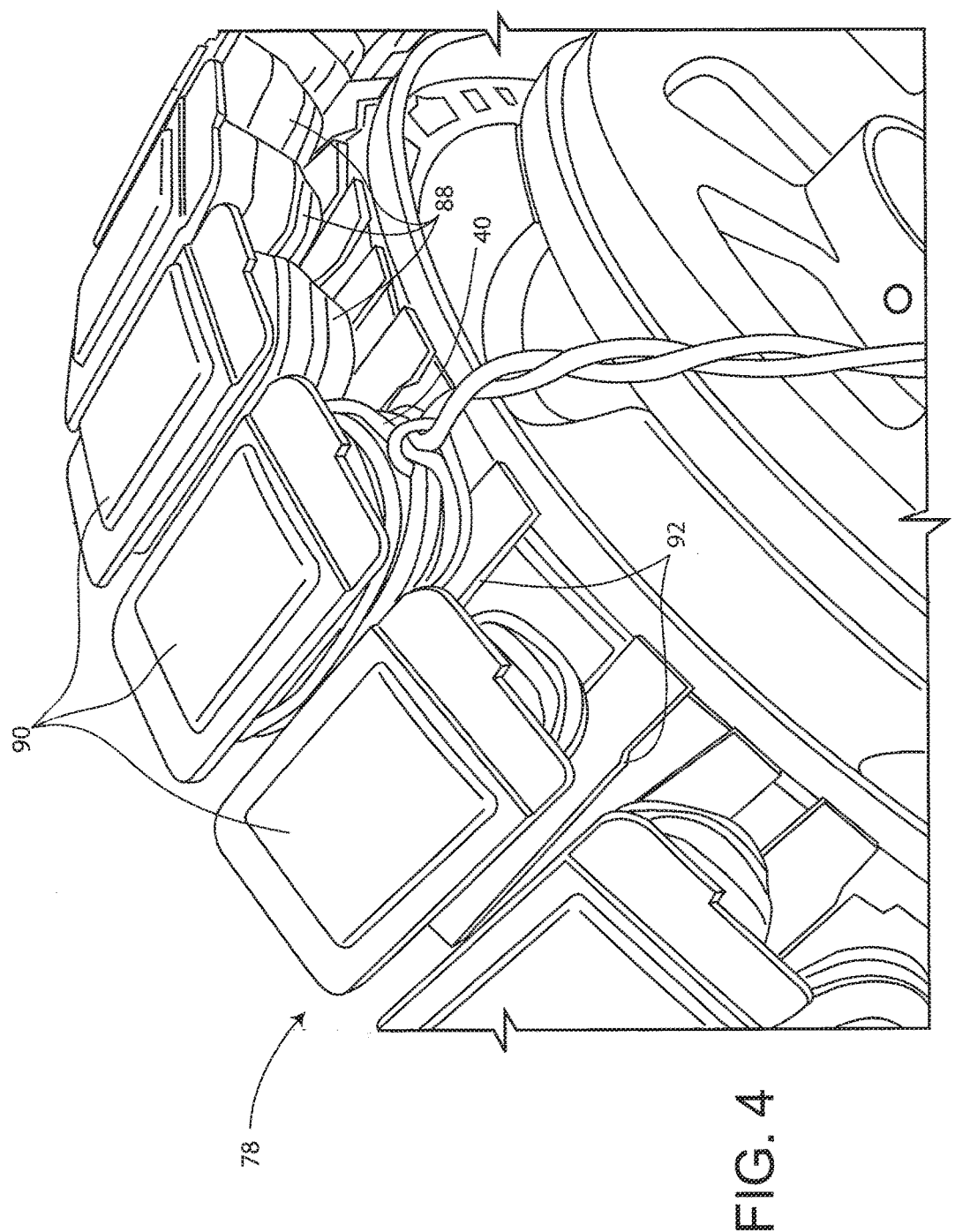
FIG. 4 is an example of a stator that may be used in the motor of FIG. 3.

For purposes of description herein the terms "upper," "lower," "right," "left," "rear," "front," "vertical," "horizontal," and derivatives thereof shall relate to the device as oriented in FIGS. 1 and 4. However, it is to be understood that the device may assume various alternative orientations and step sequences, except where expressly specified to the contrary. It is also to be understood that the specific devices and processes illustrated in the attached drawings and described in the following specification are simply exemplary embodiments of the inventive concepts defined in the appended claims. Hence, specific dimensions and other physical characteristics relating to the embodiments disclosed herein are not to be considered as limiting, unless the claims expressly state otherwise.

Figure 2:
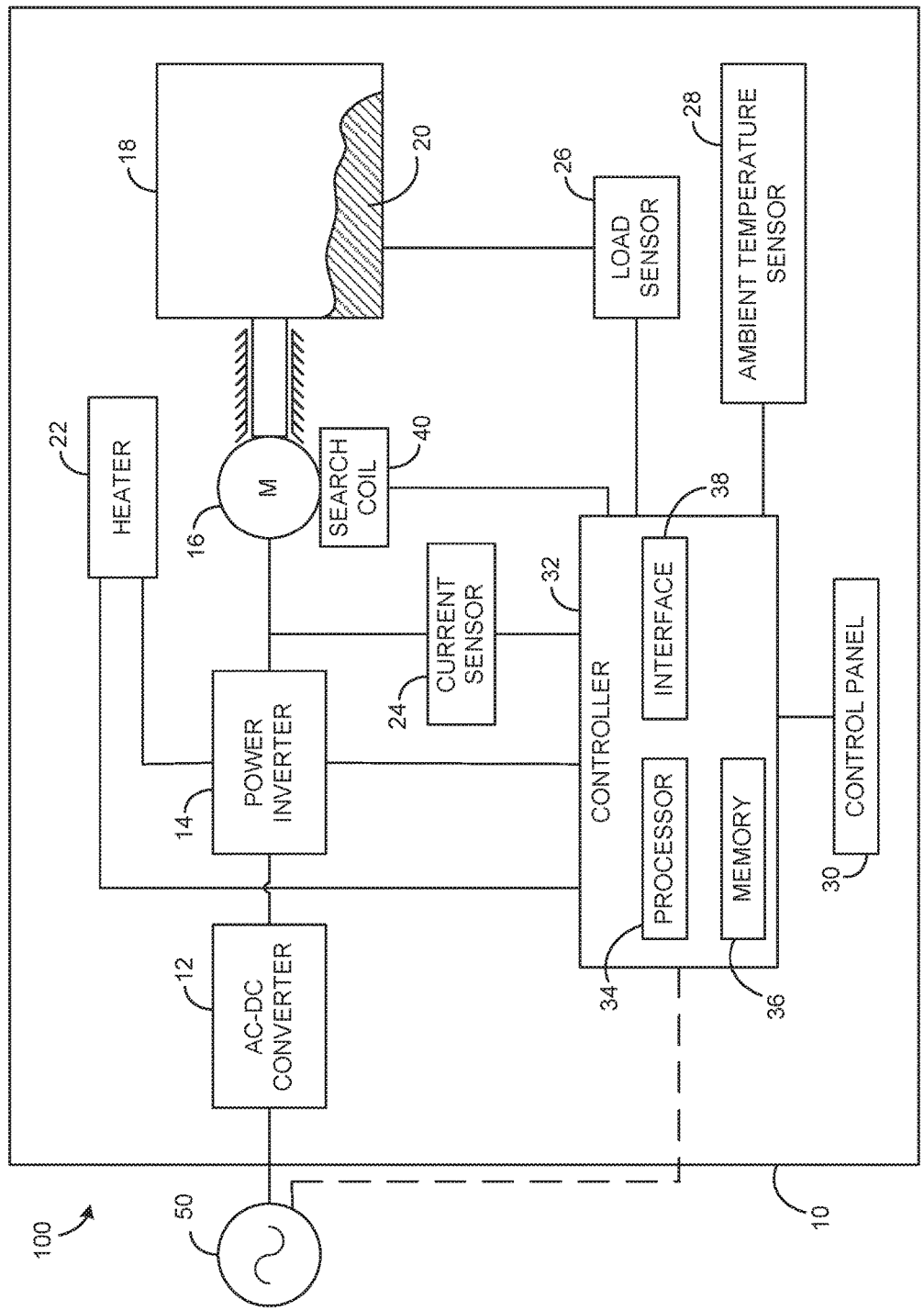
FIG. 2 is a simplified block diagram illustrating components of the laundry appliance of FIG. 1.

As indicated above, the embodiments described herein relate to a laundry appliance. FIGS. 1 and 2 show a laundry appliance 10 that happens to be in the form of a washing appliance. In some embodiments, the laundry appliance 10 may be a dryer appliance and may include additional and/or different components than those shown in FIGS. 1 and 2 and described herein.

Washing appliances may select various control parameters based upon inputs of various sensors, such as a load sensor, an ambient temperature sensor, and a current sensor that senses current flowing from an inverter to a motor that turns the drum of the washing appliance. An example of such a washing appliance is disclosed in U.S. Patent Application Publication No. 2014/0189959 A1, incorporated by reference herein in its entirety. In general, this washing appliance includes a controller that selects parameters from within a single set of control parameters that is optimized for the particular motor used in the washing appliance and the particular rotor used in that motor. However, because a manufacturer's line of laundry appliances may use motors from various suppliers, and because some of those motors may use different rotors paired with the same stator, these different laundry appliances each require different controllers that use different sets of control parameters matched to the particular motor and particular rotor used in that laundry appliance. As described below, optimizing the parameters used in the motor control algorithm can provide many advantages.

The embodiments described herein deal with the problem of determination of motor parameters to optimize the motor control algorithm performance for a particular motor sample. Two of the parameters considered in the embodiments are the motor phase resistance $R_s$ and magnetic flux constant $\lambda_m$. By knowing these parameters for the particular motor sample connected to the motor controller, the motor control algorithm can identify the motor and its rotor and can therefore be "self-tuned" to improve the motor control efficiency or other motor control goal, e.g. the maximum torque per ampere (MTPA) functionality. Thus, the controller may store a plurality of different sets of control parameters with one set for each motor/rotor combination that may be used with the controller. The controller may then identify the motor and rotor and select the parameter set that is optimized for the particular identified motor and rotor.

The stator coils in the motor present an increase in the temperature during motor operation due to the Joule losses that are dissipated on it. This increase in temperature causes an increase in the stator resistance $R_s$. The increase in the resistance can be modeled as in (1).

$$\frac{R_T}{R_t} = \frac{K+T}{K+t} \tag{1}$$

Where $R_T$ is the resistance at temperature T, $R_t$ is the resistance at temperature t, K is a constant that is 234.5 for copper and 225 for aluminum wires.

The ferrite magnets used in electric motors present a decrease in magnetic flux constant $\lambda_m$ when their temperature increases (in general, −0.2%/° C.).

The motor control algorithm uses a constant set of parameters that are embedded on a microcontroller of the motor controller once and the controller parameters (PID gains, etc.) are tuned for this set of parameters. If the motor to be controlled presents variation on its parameters (due to the reasons mentioned above) the motor controller will present degradation on the performance or, in a worst case scenario, the controller might lose the controllability of the motor.

The method proposed here can be used to measure the motor resistance $R_s$ and magnetic flux constant $\lambda_m$ when the motor temperature changes. Therefore, the motor controller can use this information to adapt its own parameters to keep the optimum performance for that particular motor and be more robust to temperature variation.

As described in detail below, a search coil 40 (FIG. 4), which is wound about one of the stator coils 88, may be used to measure the motor resistance $R_s$ and magnetic flux constant $\lambda_m$ when the motor temperature changes. In addition, the search coil can be used to detect absence of magnets, identify the motor model/supplier that is connected to the power inverter (in case of two or more motor suppliers to the same power inverter) and identify the rotor that is connected to the power inverter (in case of different rotors used for the same stator).

As mentioned above, there are cases in which the appliance manufacturer could have two motor suppliers for the same laundry appliance or even two different motor SKUs with different set of efficiencies or torque levels for each washing appliance, using the same power inverter and controller. In order to not have two different software SKUs for each supplier, the power inverter and controller have the capability to determine which motor is connected to their terminals and use a set of optimized parameters to control that particular motor.

Further, there are cases where there may be two different rotors for the same stator. For example, rotors with increased $\lambda_m$ to produce more flux (and torque) for a particular washing appliance in a range of washers even it uses the same stator to save one stator SKU. In this case the power inverter and controller might need to determine which rotor is connected to its terminals to optimize the motor control parameters for that particular rotor/stator pair.

Figure 3:
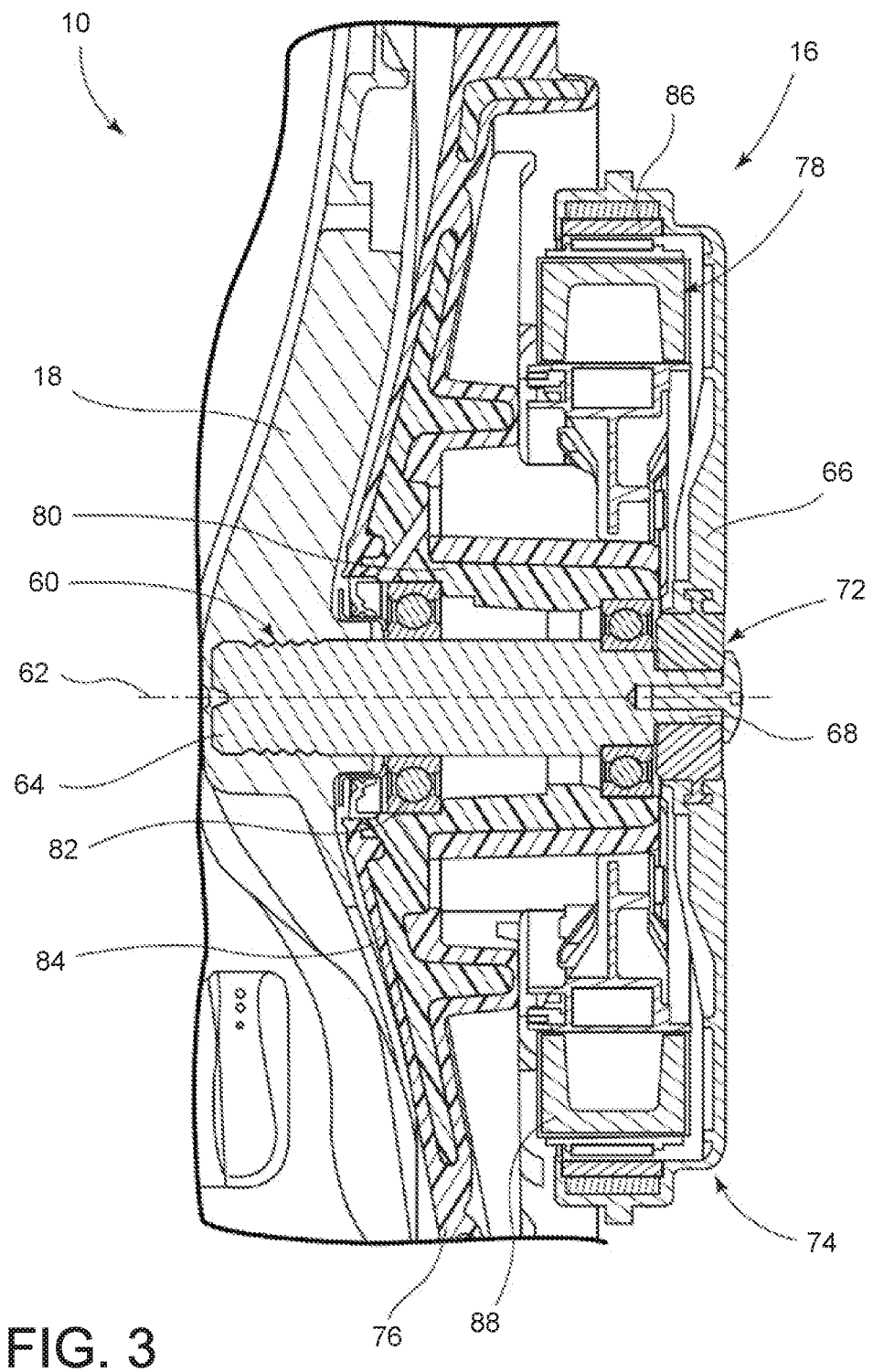
FIG. 3 is a cross-sectional view of an example of a direct drive motor that may be used in the laundry appliance of FIGS. 1 and 2.

As shown in FIG. 2, laundry appliance 10 includes a power inverter 14, a motor 16 coupled to the power inverter 14, and a controller 32 coupled to the power inverter 14 to control operation of the motor 16. As shown in FIGS. 3 and 4, the motor 16 includes a rotor 74 operable to rotate about an axis 62, a stator 78 with a plurality of teeth 90 and a plurality of stator coils 88 each wound around a corresponding tooth 90 of the stator 78, and a search coil 40 wound around a tooth 90 of the stator 78 so as to be associated with one of the stator coils 88. Referring back to FIG. 2, the controller 32 is connected to the search coil 40. The controller 32 includes a microprocessor 34 and a memory 36 containing a plurality of instructions that, when executed by the microprocessor 34, may cause the microprocessor 34 to: determine a resistance $R_s$ of the associated one of the stator coils 88 based on a measured resistance $R_{sc}$ of the search coil 40, identify the motor 16 from a plurality of possible known motors based on the resistance $R_s$ of the associated one of the stator coils 88, and configure at least one motor operation parameter based on the identity of the motor 16. The microprocessor 34 may be additionally or alternatively configured to determine a magnetic flux constant $\lambda_m$ of the motor 16 based on a measured voltage $V_{sc}$ induced in the search coil 40 caused by the rotation of the rotor 74 relative to the stator 78, identify the rotor 74 from a plurality of possible known rotors based on the magnetic flux constant $\lambda_m$ of the motor 16, and configure at least one motor operation parameter based on the identity of the rotor 74.

As further shown in FIG. 2, the laundry appliance 10 includes an AC-DC converter 12. The AC-DC converter 12 of the laundry appliance 10 is electrically coupled to an external AC mains power supply 50. The AC-DC converter 12 is a power regulating circuit that transforms AC mains power (e.g., 240 V, 60 Hz) into direct current (DC) power and supplies this DC to the other components of the laundry appliance 10. The AC-DC converter 12 is electrically coupled to the inverter 14. The inverter 14 is operable to convert the DC power supplied by the AC-DC converter 12 into AC power usable by the internal components of the laundry appliance 10. The inverter 14 includes a plurality of switching elements electrically operable to produce output AC power. In some embodiments, some or all of the components of the AC-DC converter 12 and/or the inverter 14 may be included on a control board of the laundry appliance 10 (not illustrated).

The inverter 14 is electrically coupled to the motor 16. The motor 16 may be a direct drive permanent magnet synchronous motor (also known as a brushless, alternating current (AC) motor). As shown in FIG. 3, according to the various embodiments, a motor 16 for the laundry appliance 10, such as a direct drive, may include a drive shaft 60 that is coupled to a drum 18 at a first end 64 of drive shaft 60. A rotor 74 having a rotor frame 66 is coupled proximate a second end 68 of the drive shaft 60. A central hub 72 is included within the rotor frame 66.

The drum 18 includes a cavity that is sized to receive clothes and other laundry 20 to be washed or dried in the laundry appliance 10. The drum 18 is set within a tub 76 that receives wash water for cleaning the laundry 20 (FIG. 2) set within the drum 18. The direct drive motor 16 is attached proximate the tub 76, where a stator 78 of the direct drive motor 16 is coupled to a portion of the tub 76, thereby substantially fixing the location of the stator 78. Disposed in the tub 76 is a bearing housing 80 including at least one bearing 82 that allows the drive shaft 60 to be rotated within the wall 84 of the tub 76. Typically, the rotor 74 includes magnets 86 that are in magnetic communication with stator coils 88 of the stator 78 and form a permanent synchronous motor 16. Each stator field coil 88 of the motor 16 is separately electrically connected to the inverter 14. During operation, the inverter 14 supplies AC power of the same frequency but with different phase to each stator field coil 88 of the motor 16. The multi-phased AC power flows through the stator field coils 88 of the motor 16 to produce a rotating magnetic field; that is, the direction of the combined magnetic field produced by the plurality of stator field coils 88 rotates. This rotating magnetic field interacts with the one or more permanent magnets 86 and causes the rotor 74 to rotate. In this manner, as the rotor 74 rotates about the stator 78, the connection of the rotor 74 to the drum 18 via the drive shaft 60 allows for the transfer of torque from the rotor 74 to the drive shaft 60 and, in turn, to the drum 18 such that the drum 18, drive shaft 60, and rotor 74 rotate about rotation axis 62. It is contemplated that other types of electric motors 16 can be utilized where the motor 16 includes a rotor 74 that rotates relative to a stator 78. For example, it is contemplated that the rotor 74 can rotate within the stator 78, outside the stator 78, or can include a dual-rotor configuration that rotates inside and outside of the stator 78. Such motors 16 can include, but are not limited to, direct drive motors, motors that are coupled to transmissions, belt-drive motors, and other similar electric motors. Additionally, the various aspects of the embodiments can be used in various orientations of motor 16, including motors that are positioned along a vertical axis, a horizontal axis and/or an angled axis.

A search coil 40 may be wound in a tooth 90 of the stator 78 as shown in FIG. 4. The number of turns in a single tooth ($N_{tooth}$) is defined according to the maximum speed that the motor operates (maximum induced voltage) to generate a maximum search coil voltage ($V_{sc}$) that is suitable for the measuring circuit to handle (usually 5V or 3.3V).

By knowing the number of turns ($N_{turns}$) of each motor phase and the number ($N_{slots}$) of stator slots 92, the phase BEMF ($BEMF_{phase}$) can be determined using equation (2):

$$BEMF_{phase} = V_{sc} * \frac{N_{turns}}{N_{tooth}} * \frac{N_{slots}}{3} * \sqrt{2} \qquad (2)$$

Therefore the magnetic flux constant $\lambda_m$ can be determined by equation (3):

$$\lambda_m = \frac{BEMF_{phase}}{\omega} \qquad (3)$$

Where $\omega = 2\pi f$ and f is the frequency of the $BEMF_{phase}$.

The temperature $T_{sc}$ of the search coil 40 can be monitored by knowing the resistance $R_{sc20}$ of the search coil 40 at a temperature T=20° C. This initial point can be determined by the material resistivity using equation (4) or by testing and loading this parameter in the embedded software of the motor controller.

$$R_{sc20} = \rho * \frac{l_{sc}}{S} \qquad (4)$$

Where $\rho$ is the resistivity at 20° C. of the material used in the search coil (aluminum or copper), $I_{sc}$ is the length of the search coil wire, and S is the section area of the search coil wire.

By knowing this initial point, the microcontroller 34 can determine the actual temperature $T_{sc}$ of the search coil 40 by measuring the search coil resistance $R_{sc}$ and using equation (5):

$$T_{sc} = \frac{R_{sc}}{R_{sc20}} * (K + 20) - K \qquad (5)$$

Figure 5:
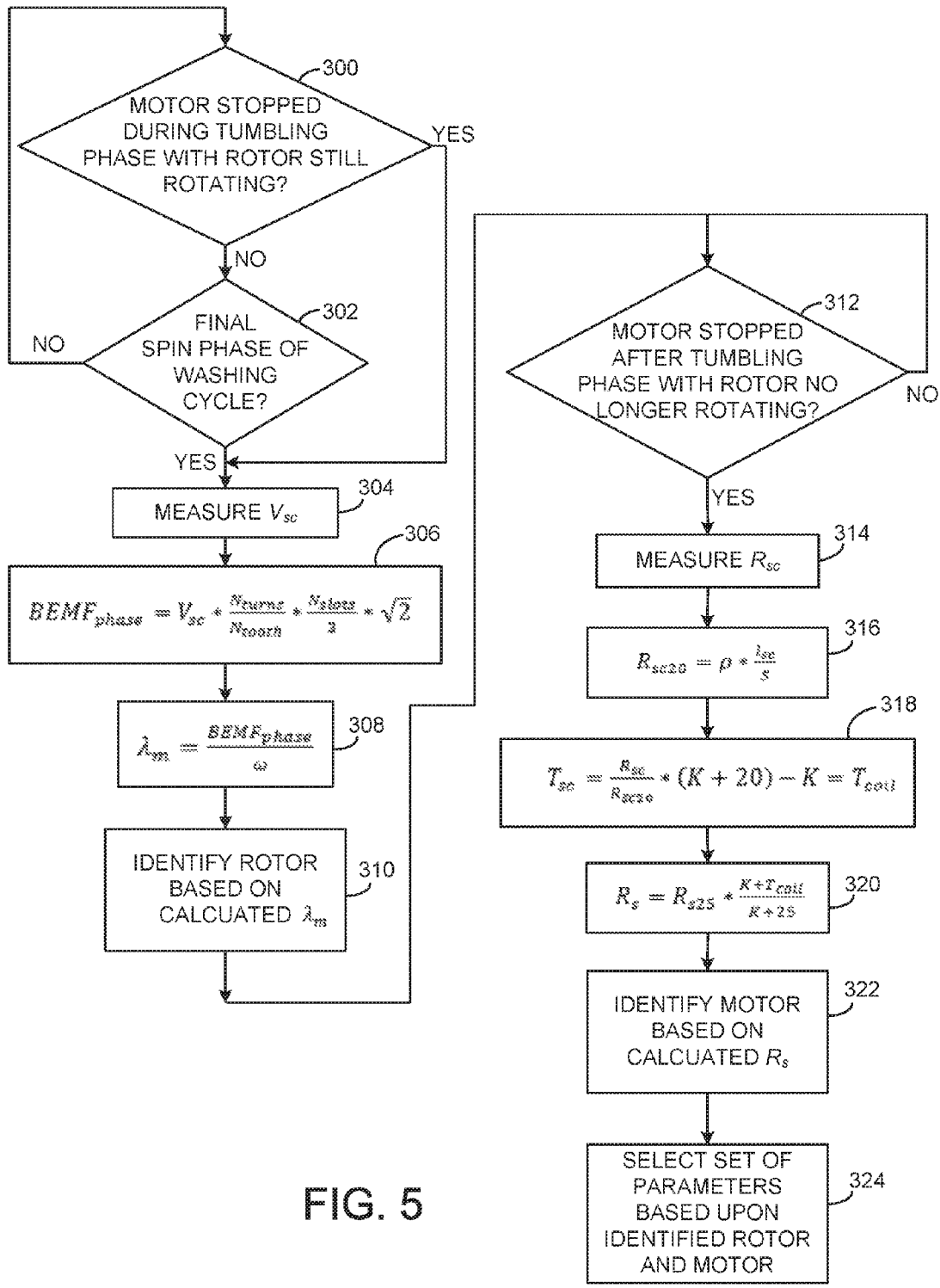
FIG. 5 is a flow chart illustrating an instruction routine executed by the microprocessor of FIGS. 2 and 6.

The temperature $T_{coil}$ of the stator coil 88 is assumed to be the same as the temperature $T_{sc}$ of the search coil 40 because the search coil 40 is assembled on the inner part (FIG. 4) of the stator coil 88. This way, the stator coil 88 resistance $R_s$ can be determined using equation (6):

$$R_s = R_{s25} * \frac{K + T_{coil}}{K + 25} \qquad (6)$$

Where $R_{s25}$ is the stator coil resistance at 25° C. and is usually available as a parameter in the software. The whole process flow is shown in FIG. 5, which is described below.

In order to measure the voltage $V_{sc}$ of the search coil 40, the stator coils 88 may be at free-run condition (no current imposed) and the rotor 74 may be rotating (to generate BEMF). In a washing appliance 10 this can be done at each stop of the motor 16 during tumbling phases or in the final spin phase of a washing cycle. Thus, the process begins in step 300 where the microprocessor 34 executes instructions stored in memory 36 that cause microprocessor 34 to determine when the motor 16 has stopped during tumbling phase with the rotor 74 still turning (step 300) or when the laundry appliance 10 has begun the final phase of a washing cycle (step 302). When either of these events occurs, the microprocessor 34 enables measurement of the voltage $V_{sc}$ of the search coil 40 in step 304. Next, the microprocessor 34 determines the magnetic flux constant $\lambda_m$ of the motor based on the measured voltage $V_{sc}$ of the search coil 40. The magnetic flux constant $\lambda_m$ may be determined using equations (2) and (3) above, which are illustrated in steps 306 and 308, respectively. Then, in step 310, microprocessor 34 identifies the rotor 74 from a plurality of possible known rotors based on the magnetic flux constant $\lambda_m$ of the motor 16.

In order to measure the resistance $Rsc$ of the search coil 40, the motor 16 may be stopped so as to not generate BEMF in the search coil 40. In addition, no current is imposed to the stator 78 as it might generate electromagnetic interference in the $R_{sc}$ measuring circuit. This $R_{sc}$ measurement can be performed in the stop phase of a tumbling of the washing appliance 10, as an example. Thus, in step 312, the microprocessor 34 executes instructions stored in memory 36 that cause microprocessor 34 to determine when the motor 16 has stopped after the tumbling phase with the rotor 74 is no longer turning. When this event occurs, the microprocessor 34 enables measurement of the resistance $R_{sc}$ of the search coil 40 in step 314. Next, the microprocessor 34 determines the resistance $R_s$ of the stator coil 88 associated with the search coil 40 based on the resistance $R_{sc}$ of the search coil 40. The resistance $R_s$ of the stator coil 88 may be determined using equations (4)-(6) above, which are illustrated in steps 316-320, respectively. Then, in step 322, microprocessor 34 identifies the motor 16 from a plurality of possible known motors based on the resistance $R_s$ of the stator coil 88.

Once the rotor 74 and motor 16 are identified, microprocessor 34 selects a set of parameters from a plurality of parameter sets stored in memory 36 that is associated with the identified motor 16 and rotor 74.

Although the process described above identifies both the rotor 74 and motor 16 and uses both identities to select a parameter set, it will be appreciated that many of the advantages obtained thereby may still be obtained if a parameter set is selected based on the identity of the rotor or motor alone.

Optionally, the microprocessor 34 may disconnect the output of the search coil 40 from itself or any other measuring circuit using a relay or the like when the search coil 40 is not being used for measuring $V_{sc}$ or $R_{sc}$ to prevent high voltages from being coupled to the microprocessor or other measuring circuit.

To implement a motor detection capability, the search coil 40 in the motor of supplier A can have a different 20° C. resistance compared to that of supplier B. For example, the search coil 40 in the motor of supplier A might have a 20° C. resistance of 0.5Ω on its specification, and the search coil 40 in the motor of supplier B might have a 20° C. resistance of 1Ω. This way there is a significant offset in the temperature versus resistance characteristic of the search coil, and therefore the controller 32 can determine which motor 16 is connected to the terminals of the power inverter 14.

To implement a rotor detection capability, the magnetic flux constant $\lambda_m$ as determined above can be used. This way if the rotors have different magnetic flux constants, the controller 32 can determine which rotor 74 is in the motor 16 connected to the terminals of the power inverter 14.

By optimizing the motor controller 32 to the actual magnetic flux constant $\lambda_m$ and stator coil resistance $R_s$, one can reduce energy consumption of the electric drive by reducing the current needed to produce the motor torque as the MTPA could be achieved for any motor sample. Further, one can improve the motor controller robustness to motor parameter variations due to temperature. Additionally, better optimization of the motor controller for the particular motor sample can lead to a reduced number of starting failures.

By providing motor detection capability to discover the motor supplier, and using an optimized set of parameters for that particular motor, one can reduce the number of software SKUs needed for a laundry appliance family.

By providing rotor detection capability to discover the rotor model used in the motor connected to the power inverter terminals and using a set of optimized motor control parameters to that particular rotor, one can reduce the software SKU needs.

Benefits to the owners of the laundry appliances implementing the embodiments herein include a more robust product (better starting performance), reduced energy consumption, and reduced logistics complexity as the number of software SKUs might be reduced.

In the illustrative embodiment shown in FIG. 1, the laundry appliance 10 is a front-loaded appliance in which the drum 18 is accessed through an opening defined in the front of the laundry appliance 10. It should be appreciated that in other embodiments the laundry appliance 10 may have other configurations. For example, the laundry appliance 10 may be a top-loaded appliance in which the drum 18 is accessed through an opening defined in the top of the laundry appliance 10. Further, in the illustrative embodiment the rotational axis 62 (FIG. 4) of the drum 18 is horizontal. It should be appreciated that the rotational axis may have other configurations; for example, the rotational axis may be vertical.

Having described how the laundry appliance 10 identifies the motor and rotor in order to select a set of control parameters, a general description is provided below of additional components of the laundry appliance and examples of the manner in which the control parameters may be used to control the motor 16 and the other components of the laundry appliance. Commonly assigned U.S. Patent Application Publication No. 2014/0189959 A1 discloses additional details of how the parameters may be used.

Referring back to FIG. 2, the laundry appliance 10 may further include a heater 22 electrically coupled to the inverter 14 and controller 32. The heater 22 is operable to either heat wash water inside the drum 18 (in the case of a washing appliance) or heat the interior of the drum 18 (in the case of a dryer). The heater 22 may include a resistive heating element operable to convert AC power supplied by the inverter 14 into heat. The power consumption and associated heat output of the heater 22 may be controlled through pulse-width modulation of the input AC power. In other embodiments, the heater 22 may include two or more resistive heat elements. In such embodiments, the power consumption and heat output of the heater 22 may be controlled through selectively energizing the resistive heating elements. In other embodiments, the heater may be an electronically controlled gas valve and a combustion chamber in which gas is burned to produce heat.

The laundry appliance 10 may also further include a current sensor 24 electrically coupled to the inverter 14 and the motor 16. The current sensor 24 is configured to generate signals representative of the electrical current supplied by the inverter 14 to the motor 16. Although illustrated as a single component, the current sensor 24 may include multiple current-measuring components. For example, the current sensor 24 may include one current-measuring component for each stator field coil 88 of the motor 16. The current sensor 24 is electrically coupled to controller 32.

The laundry appliance 10 may also include a load sensor 26 configured to generate signals representative of the amount of laundry and wash water loaded inside of the drum 18. The load sensor 26 may be a physical displacement sensor attached to the drum 18. The weight of the load causes the drum 18 to move down slightly. This displacement is proportional to the amount of laundry and wash water inside the drum 18. In other embodiments, the load sensor 26 may be integrated in other components of the laundry appliance 10 or software based. For example, the load sensor 26 may measure water level in the drum 18 or may measure motor torque to determine the amount of laundry and wash water inside of the drum 18. The load sensor 26 may also determine the type of fabric loaded inside of the drum 18 based on the weight of the load or on the amount of water absorbed by the laundry. The load sensor 26 is also electrically coupled to the controller 32.

The laundry appliance 10 may include an ambient temperature sensor 28 configured to generate signals representative of the ambient temperature of the laundry appliance 10. The ambient temperature sensor 28 is a thermocouple. In other embodiments, the ambient temperature sensor 28 may be integrated in other components of the laundry appliance 10 or software based. For example, ambient temperature may be determined through measurement of the initial resistance of the stator field coils 88 of the motor 16. The temperature of the motor 16 may be calculated based on this resistance, and the ambient temperature may be calculated based on the temperature of the motor 16. In some embodiments, the ambient temperature may be calculated based on any deviation between the temperature of the motor and a predicted temperature of the motor. The ambient temperature sensor 28 is also electrically coupled to the controller 32.

Although the illustrated embodiment includes discrete current sensor 24, load sensor 26, and ambient temperature sensor 28, in some embodiments, such sensors may be incorporated in other components of the laundry appliance 10. In particular, in some embodiments, the motor 16 may be used to perform the functions of the current sensor 24, load sensor 26, and ambient temperature sensor 28. As discussed above, the motor 16 may be used to determine the ambient temperature. In some embodiments, dynamic measurement of the motor 16 may be used to determine the amount of laundry and wash water inside of the drum 18. For example, the power consumed by the motor 16 can be used to estimate the mass of the load that is spinning. As another example, as the load is spinning, the load may be accelerated or decelerated by the motor 16. The torque of the motor 16 may be determined based on current consumption; given the torque and acceleration, the mass of the load may be determined.

The laundry appliance 10 includes a control panel 30, which is the user interface of the laundry appliance 10. The control panel 30 is configured to generate signals representative of a wash cycle program selected by the user. For example, the selected wash cycle program may specify fabric type, water temperature, and wash features (e.g., permanent press, delicate, rinse only, and the like). Thus, in some embodiments, rather than detecting fabric type with the load sensor 26, fabric type may be specified by the user using the control panel 30. The control panel 30 may be embodied as a plurality of knobs, switches, and other user controls. In some embodiments, the control panel 30 may be embodied as a touch screen interface. The control panel 30 is also electrically coupled to the controller 32.

As described briefly above, the laundry appliance 10 includes the controller 32. The controller 32 is, in essence, the master computer responsible for interpreting electrical signals sent by controls and sensors of the laundry appliance 10, including the current sensor 24, the load sensor 26, and the ambient temperature sensor 28. The controller 32 is also responsible for activating or energizing electronically-controlled components associated with the inverter 14, the motor 16, and the heater 22. For example, the controller 32 is configured to control the various components of the laundry appliance 10 according to a selected wash cycle program. In particular, the controller 32 may be operable to model the wash cycle of the laundry appliance 10 and adapt the selected wash cycle program accordingly.

To do so, the controller 32 may include a number of electronic components commonly associated with electronic units utilized in the control of electromechanical systems. For example, the controller 32 may include, amongst other components customarily included in such devices, a processor such as the microprocessor 34 and the memory device 36. The microprocessor 34 may be any type of device capable of executing software or firmware, such as a microcontroller, microprocessor, digital signal processor, or the like. The memory device 36 may be embodied as one or more non-transitory, appliance-readable media. The memory device 36 is provided to store, amongst other things, instructions in the form of, for example, a software routine (or routines) which, when executed by the microprocessor 34, allows the controller 32 to control operation of the laundry appliance 10.

The controller 32 may also include an analog interface circuit 38. The analog interface circuit 38 converts output signals (e.g., from the inverter 14) into signals which are suitable for presentation to an input of the microprocessor 34. In particular, the analog interface circuit 38, by use of an analog-to-digital (A/D) converter (not shown) or the like, converts analog signals into digital signals for use by the microprocessor 34. It should be appreciated that the A/D converter may be embodied as a discrete device or number of devices, or may be integrated into the microprocessor 34. It should be appreciated that if the inverter 14 (or any other sensor associated with the laundry appliance 10) generates a digital output signal, the analog interface circuit 38 may be bypassed.

Similarly, the analog interface circuit 38 converts signals from the microprocessor 34 into output signals which are suitable for presentation to the electrically-controlled components associated with the laundry appliance 10 (e.g., the inverter 14). In particular, the analog interface circuit 38, by use of a digital-to-analog (D/A) converter (not shown) or the like, converts the digital signals generated by the microprocessor 34 into analog signals for use by the electronically-controlled components associated with the laundry appliance 10. It should be appreciated that, similar to the A/D converter described above, the D/A converter may be embodied as a discrete device or number of devices, or may be integrated into the microprocessor 34. It should also be appreciated that if the inverter 14 (or any other electronically-controlled component associated with the laundry appliance 10) operates on a digital input signal, the analog interface circuit 38 may be bypassed. In some embodiments, the controller 32 may communicate with other devices on the electrical grid concerning electrical demand and usage through the AC mains power 50 or through another communications interface (not illustrated).

Figure 6:
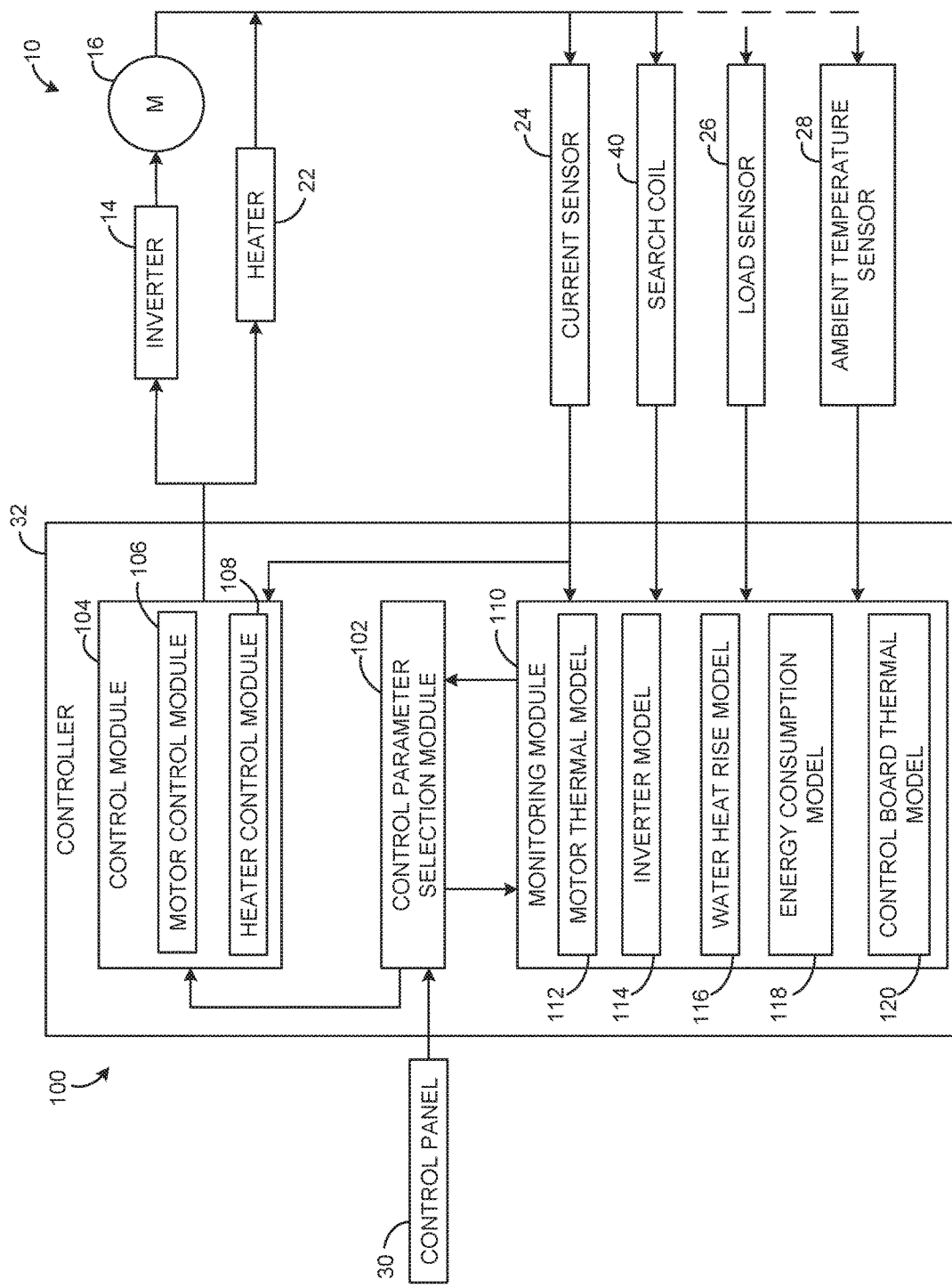
FIG. 6 is a simplified block diagram of an environment established by an electronic controller of the laundry appliance of FIGS. 1 and 2.

Referring now to FIG. 6, the controller 32 establishes an environment 100 in use. The illustrative environment 100 includes a control parameter selection module 102, a control module 104, and a monitoring module 110. The various modules of the environment 100 may be embodied as hardware, firmware, software, or a combination thereof.

The control parameter selection module 102 is configured to receive the selected wash cycle program from the control panel 30. Based on the selected wash cycle program, the control parameter selection module 102 determines appropriate control parameters for various components of the laundry appliance 10. Such control parameters may be determined from one or more lookup tables embedded in the controller 32, which may include various sets of parameters associated with various motors and rotors that may be used in the laundry appliance where the particular set that is selected is based on the identity of the motor and/or rotor as described above. The control parameter selection module 102 provides determined control parameters to the control module 104 and the monitoring module 110 and directs the control module 104 to begin operation of the washing appliance.

The control module 104 includes conventional systems for controlling the motor 16 and the heater 22 of the laundry appliance 10. For example, the control module 104 may include a number of controllers. The control module 104 receives feedback directly from the current sensor 24. In other embodiments, the control module 104 may receive feedback from other sensors of the laundry appliance 10. In some embodiments, the motor 16 and the heater 22 may be controlled by sub-modules, for example, by a motor control module 106 and a heater control module 108.

The monitoring module 110 operates a plurality of system models of the laundry appliance 10. In addition to receiving the control parameters from the module 102, the monitoring module 110 receives other input data from the sensors of the laundry appliance 10, including the current sensor 24, the load sensor 26, and the ambient temperature sensor 28. Using this input data, the monitoring module 110 determines an operating condition of the laundry appliance 10 as the wash cycle progresses. As used herein, the term "operating condition" refers to any measured state during the wash cycle, and includes, for example, environmental conditions (i.e., ambient temperature, water temperature, motor electrical current, etc.) and other conditions of the laundry appliance 10. Based on the determined operating condition, the monitoring module 110 performs numerical simulations of the laundry appliance 10 to predict one or more operational parameters of the laundry appliance 10, as described in greater detail in commonly assigned U.S. Patent Application Publication No. 2014/0189959 A1, the entire disclosure of which is incorporated by reference herein. For example, based on the determined ambient temperature, the monitoring module 110 may simulate the temperature of the motor 16 throughout the entire wash cycle. In some embodiments, such simulations may be performed by sub-modules, for example, by a motor thermal model 112, an inverter model 114, a water heat rise model 116, an energy consumption model 118, and/or a control board thermal model 120. Of course, the monitoring module 110 may predict other operational parameters of the laundry appliance 10 and is not limited to those included in the illustrative embodiment.

The control parameter selection module 102 evaluates the predicted operational parameters and determines whether to adjust the control parameters of the selected wash cycle program. For example, if the monitoring module 110 determines that the motor temperature will be too high, the control parameter selection module 102 may modulate the working conditions of the motor 16 to reduce the motor temperature. The adjusted control parameters are then provided to the modules 104, 106, 108. As a result, the operation of the laundry appliance 10 may be adjusted.

It will be understood by one having ordinary skill in the art that construction of the described device and other components is not limited to any specific material. Other exemplary embodiments of the device disclosed herein may be formed from a wide variety of materials, unless described otherwise herein.

For purposes of this disclosure, the term "coupled" (in all of its forms, couple, coupling, coupled, etc.) generally means the joining of two components (electrical or mechanical) directly or indirectly to one another. Such joining may be stationary in nature or movable in nature. Such joining may be achieved with the two components (electrical or mechanical) and any additional intermediate members being integrally formed as a single unitary body with one another or with the two components. Such joining may be permanent in nature or may be removable or releasable in nature unless otherwise stated.

It is also important to note that the construction and arrangement of the elements of the device as shown in the exemplary embodiments is illustrative only. Although only a few embodiments of the present innovations have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter recited. For example, elements shown as integrally formed may be constructed of multiple parts or elements shown as multiple parts may be integrally formed, the operation of the interfaces may be reversed or otherwise varied, the length or width of the structures and/or members or connector or other elements of the system may be varied, the nature or number of adjustment positions provided between the elements may be varied. It should be noted that the elements and/or assemblies of the system may be constructed from any of a wide variety of materials that provide sufficient strength or durability, in any of a wide variety of colors, textures, and combinations. Accordingly, all such modifications are intended to be included within the scope of the present innovations. Other substitutions, modifications, changes, and omissions may be made in the design, operating conditions, and arrangement of the desired and other exemplary embodiments without departing from the spirit of the present innovations.

It will be understood that any described processes or steps within described processes may be combined with other disclosed processes or steps to form structures within the scope of the present device. The exemplary structures and processes disclosed herein are for illustrative purposes and are not to be construed as limiting.

It is also to be understood that variations and modifications can be made on the aforementioned structures and methods without departing from the concepts of the present device, and further it is to be understood that such concepts are intended to be covered by the following claims unless these claims by their language expressly state otherwise.

The above description is considered that of the illustrated embodiments only. Modifications of the device will occur to those skilled in the art and to those who make or use the device. Therefore, it is understood that the embodiments shown in the drawings and described above is merely for illustrative purposes and not intended to limit the scope of the device, which is defined by the following claims as interpreted according to the principles of patent law, including the Doctrine of Equivalents.

What is claimed is:

1. A laundry appliance, comprising:
    a motor; and
    a controller connected to the motor, the controller including a microprocessor and a memory containing a plurality of instructions that, when executed by the microprocessor, cause the microprocessor to:
        determine a characteristic of the motor,
        identify the motor from a plurality of possible known motors based on the characteristic, and
        configure at least one motor operation parameter based on the identity of the motor.

2. The laundry appliance of claim 1, wherein the characteristic of the motor is a resistance of a stator coil of a stator of the motor, and wherein the microprocessor identifies the motor based on the resistance of the stator coil.

3. The laundry appliance of claim 1, wherein the motor comprises:
    a rotor operable to rotate about an axis;
    a stator with a plurality of teeth and stator coils wound around each tooth of the stator; and
    a search coil wound around a tooth of the stator and thereby associated with one of the stator coils,
    wherein the microprocessor determines the characteristic of the motor by determining a resistance of the associated one of the stator coils based on a measured resistance of the search coil.

4. The laundry appliance of claim 3, wherein the microprocessor determines the resistance of the associated one of the stator coils by:
    determining the temperature of the search coil based upon the measured resistance of the search coil; and
    computing the resistance of the associated one of the stator coils as a function of the temperature of the search coil.

5. The laundry appliance of claim 1, wherein the microprocessor configures the at least one motor operation parameter based on the identity of the motor by:
    storing a plurality of sets of motor operation parameters with each set associated with a motor that may be used in the laundry appliance, and
    selecting a set of motor operation parameters from the plurality of sets of motor operation parameters that is associated with the identified motor.

6. The laundry appliance of claim 3, wherein, when executing the instructions, the microprocessor is caused to:
    determine a magnetic flux constant of the motor based on a measured voltage induced in the search coil caused by the rotation of the rotor relative to the stator, identify the rotor from a plurality of possible known rotors based on the magnetic flux constant of the motor, and configure at least one motor operation parameter based on the identity of the rotor.

7. The laundry appliance of claim 6, wherein the microprocessor configures at least one motor operation parameter based on both the identity of the motor and the identity of the rotor.

8. A laundry appliance, comprising:
a motor including a stator and a rotor; and
a controller connected to the motor, the controller including a microprocessor and a memory containing a plurality of instructions that, when executed by the microprocessor, cause the microprocessor to:
determine a characteristic of the motor,
identify the rotor from a plurality of possible known rotors based on the characteristic of the motor, and
configure at least one motor operation parameter based on the identity of the rotor.

9. The laundry appliance of claim 8, wherein the characteristic of the motor is a magnetic flux constant of the motor.

10. The laundry appliance of claim 8, wherein the stator comprises a plurality of teeth and stator coils wound around each tooth of the stator, and wherein the laundry appliance further comprises a search coil wound around a tooth of the stator and thereby associated with one of the stator coils, wherein the microprocessor determines a characteristic of the motor based on a measured voltage induced in the search coil caused by the rotation of the rotor relative to the stator.

11. The laundry appliance of claim 8, wherein the microprocessor configures the at least one motor operation parameter based on the identity of the rotor by:
storing a plurality of sets of motor operation parameters with each set associated with a rotor that may be used in the laundry appliance, and
selecting a set of motor operation parameters from the plurality of sets of motor operation parameters that is associated with the identified rotor.

12. A method of controlling a motor in a laundry appliance, the method comprising:
determining a characteristic of the motor;
identifying the motor from a plurality of possible known motors based on the characteristic;
configuring at least one motor operation parameter based on the identity of the motor; and
controlling the motor using the at least one motor operation parameter.

13. The method of claim 12, wherein the characteristic of the motor is a resistance of a stator coil of a stator of the motor, and wherein the motor is identified based on the resistance of the stator coil.

14. The method of claim 12, wherein the motor comprises a rotor and a stator with a method further comprises the step of providing a search coil wound around a tooth of the stator and thereby associated with one of the stator coils, wherein the step of determining the characteristic of the motor includes determining a resistance of the associated one of the stator coils based on a measured resistance of the search coil.

15. The method of claim 12, wherein the step of configuring the at least one motor operation parameter based on the identity of the motor comprises:
storing a plurality of sets of motor operation parameters with each set associated with a motor that may be used in the laundry appliance, and
selecting a set of motor operation parameters from the plurality of sets of motor operation parameters that is associated with the identified motor.

16. The method of claim 12, wherein the characteristic of the motor is a magnetic flux constant of the motor.

17. The method of claim 16, wherein the motor comprises a rotor and a stator with a plurality of teeth and stator coils wound around each tooth of the stator, and wherein the method further comprises the step of providing a search coil wound around a tooth of the stator and thereby associated with one of the stator coils, wherein the method further comprises:
determining a magnetic flux constant of the motor based on a measured voltage induced in the search coil caused by the rotation of the rotor relative to the stator,
identifying the rotor from a plurality of possible known rotors based on the magnetic flux constant of the motor, and
configuring at least one motor operation parameter based on the identity of the rotor.

18. The method of claim 16, wherein the step of configuring the at least one motor operation parameter based on the identity of the rotor comprises:
storing a plurality of sets of motor operation parameters with each set associated with a rotor that may be used in the laundry appliance, and
selecting a set of motor operation parameters from the plurality of sets of motor operation parameters that is associated with the identified rotor.

19. The method of claim 16, wherein the at least one motor operation parameter is configured based on both the identity of the motor and the identity of the rotor.

20. The method of claim 19, wherein the step of configuring the at least one motor operation parameter based on both the identity of the motor and the identity of the rotor comprises:
storing a plurality of sets of motor operation parameters with each set associated with each combination of a motor and a rotor that may be used in the laundry appliance, and
selecting a set of motor operation parameters from the plurality of sets of motor operation parameters that is associated with the identified motor and the identified rotor.

* * * * *